(12) United States Patent
Kehoe

(10) Patent No.: US 9,901,960 B2
(45) Date of Patent: Feb. 27, 2018

(54) ACCESSORY FOR A RECIPROCATING POWER TOOL

(71) Applicant: Milwaukee Electric Tool Corporation, Brookfield, WI (US)

(72) Inventor: Sean T. Kehoe, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 152 days.

(21) Appl. No.: 13/763,206

(22) Filed: Feb. 8, 2013

(65) Prior Publication Data

US 2013/0205600 A1 Aug. 15, 2013

Related U.S. Application Data

(60) Provisional application No. 61/597,532, filed on Feb. 10, 2012, provisional application No. 61/605,436, filed on Mar. 1, 2012, provisional application No. 61/642,217, filed on May 3, 2012.

(51) Int. Cl.
| | |
|---|---|
| *B08B 1/00* | (2006.01) |
| *B25D 3/00* | (2006.01) |
| *B23D 61/00* | (2006.01) |
| *B23D 61/12* | (2006.01) |

(52) U.S. Cl.
CPC ............ *B08B 1/008* (2013.01); *B23D 61/00* (2013.01); *B23D 61/123* (2013.01); *B25D 3/00* (2013.01)

(58) Field of Classification Search
CPC ...... B08B 1/008; B23D 61/00; B23D 61/123; B25D 3/00

USPC ......... 30/169, 392, 351, 342, 337, 339, 514, 30/166.3, 346, 355; 83/698.11, 835; 15/236.01

See application file for complete search history.

(56) References Cited

U.S. PATENT DOCUMENTS

| | | | |
|---|---|---|---|
| 1,978,532 A | 10/1934 | Gurnee | |
| 2,987,086 A | 6/1961 | Westlund, Jr. | |
| 4,020,555 A | 5/1977 | Hedrick | |
| 5,848,473 A | 12/1998 | Brandenburg, Jr. | |
| 6,149,510 A | 11/2000 | Romagnoli | |
| 6,209,208 B1 * | 4/2001 | Marinkovich et al. | 30/392 |
| D562,517 S * | 2/2008 | Henke | D32/46 |
| 7,526,867 B2 | 5/2009 | Park | |
| 7,600,458 B2 | 10/2009 | Hampton et al. | |
| 7,806,033 B2 | 10/2010 | Kocher et al. | |
| D687,275 S * | 8/2013 | Neitzell | D8/20 |
| 2006/0174495 A1 | 8/2006 | Jumior | |

(Continued)

*Primary Examiner* — Jonathan Riley
*Assistant Examiner* — Liang Dong
(74) *Attorney, Agent, or Firm* — Michael Best & Friedrich LLP

(57) ABSTRACT

An accessory configured for use with a reciprocating saw having a spindle. The accessory is configured to reciprocate with the spindle. The accessory includes an attachment portion having a tang including a first tang member and a second tang member and an aperture that extends through the attachment portion from a first broad side to a second broad side. The attachment portion also includes a first radius, which terminates to define a projection, located on a first narrow side. The attachment portion also includes a second radius, which terminates to define a projection, located on a second narrow side. The first radius and the second radius are configured to contact an exterior of the spindle.

12 Claims, 6 Drawing Sheets

(56) References Cited

U.S. PATENT DOCUMENTS

| | | | |
|---|---|---|---|
| 2008/0172890 A1* | 7/2008 | Shetterly | B23D 61/126 |
| | | | 30/355 |
| 2008/0276470 A1* | 11/2008 | Ritter | B23D 49/167 |
| | | | 30/392 |
| 2009/0223064 A1* | 9/2009 | Venderley | 30/169 |
| 2009/0261539 A1 | 10/2009 | Paulsen | |
| 2009/0320299 A1* | 12/2009 | Kuhn | B08B 1/00 |
| | | | 30/355 |
| 2010/0175532 A1* | 7/2010 | Evatt et al. | 83/835 |
| 2010/0218389 A1 | 9/2010 | Kalomeris et al. | |

\* cited by examiner

ACCESSORY FOR A RECIPROCATING POWER TOOL

CROSS-REFERENCE TO RELATED APPLICATIONS

This application claims priority to U.S. Provisional Application No. 61/597,532, filed Feb. 10, 2012, U.S. Provisional Application No. 61/605,436, filed Mar. 1, 2012, and U.S. Provisional Application No. 61/642,217, filed May 3, 2012, the entire contents all of which are hereby incorporated by reference herein.

BACKGROUND

The present invention relates to accessories for power tools, and more particularly to an accessory for a reciprocating saw.

Reciprocating power tools, such as reciprocating saws, typically utilize accessory tools, such as blades, brushes, and the like. The accessories enable the reciprocating tools to be used for numerous applications on various working surfaces and for a variety of types of projects.

SUMMARY

In one embodiment, the invention provides a scraper blade configured for use with a reciprocating saw having a spindle. The scraper blade is configured to be coupled to and reciprocate with the spindle. The scraper blade includes a first end configured to be received in the spindle of the reciprocating saw and a second end opposite the first end. A cutting edge defines the second end of the scraper blade. The scraper blade also includes a first broad side and a second broad side that extend between the first end and the second end. The second broad side faces opposite the first broad side. Additionally, the scraper blade includes a first narrow side and a second narrow side that extend between the first and second broad sides and the first and second ends. The second narrow side faces opposite the first narrow side. The scraper blade further includes an attachment portion adjacent the first end of the scraper blade. The attachment portion includes a tang including a first tang member and a second tang member and an aperture that extends through the attachment portion from the first broad side to the second broad side. The attachment portion also includes a first radius, which terminates to define a projection, located on the first narrow side. The attachment portion also includes a second radius, which terminates to define a projection, located on the second narrow side. The first radius and the second radius are configured to contact an exterior of the spindle.

In another embodiment the invention provides an accessory configured for use with a reciprocating saw having a spindle. The accessory is configured to be coupled to the spindle to reciprocate with the spindle. The accessory includes a first end configured to be received in the spindle of the reciprocating saw and a second end opposite the first end. The accessory includes a first broad side and a second broad side that extend between the first and second ends. The second broad side faces opposite the first broad side. Additionally, the accessory includes a first narrow side and a second narrow side that extend between the first and second broad sides and the first and second ends. The second narrow side faces opposite the first narrow side. The accessory further includes an attachment portion adjacent the first end of the accessory and the attachment portion includes a tang including a first tang member and a second tang member. The attachment portion also includes an aperture that extends through the attachment portion from the first broad side to the second broad side. The attachment portion also includes a first radius, which terminates to define a projection, located on the first narrow side. The attachment portion also includes a second radius, which terminates to define a projection, located on the second narrow side. The first radius and the second radius are configured to contact an exterior of the spindle. A first recess is located on the first narrow side between the first end of the accessory and the first projection, and a second recess is located on the second narrow side between the first end of the accessory and the second projection.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
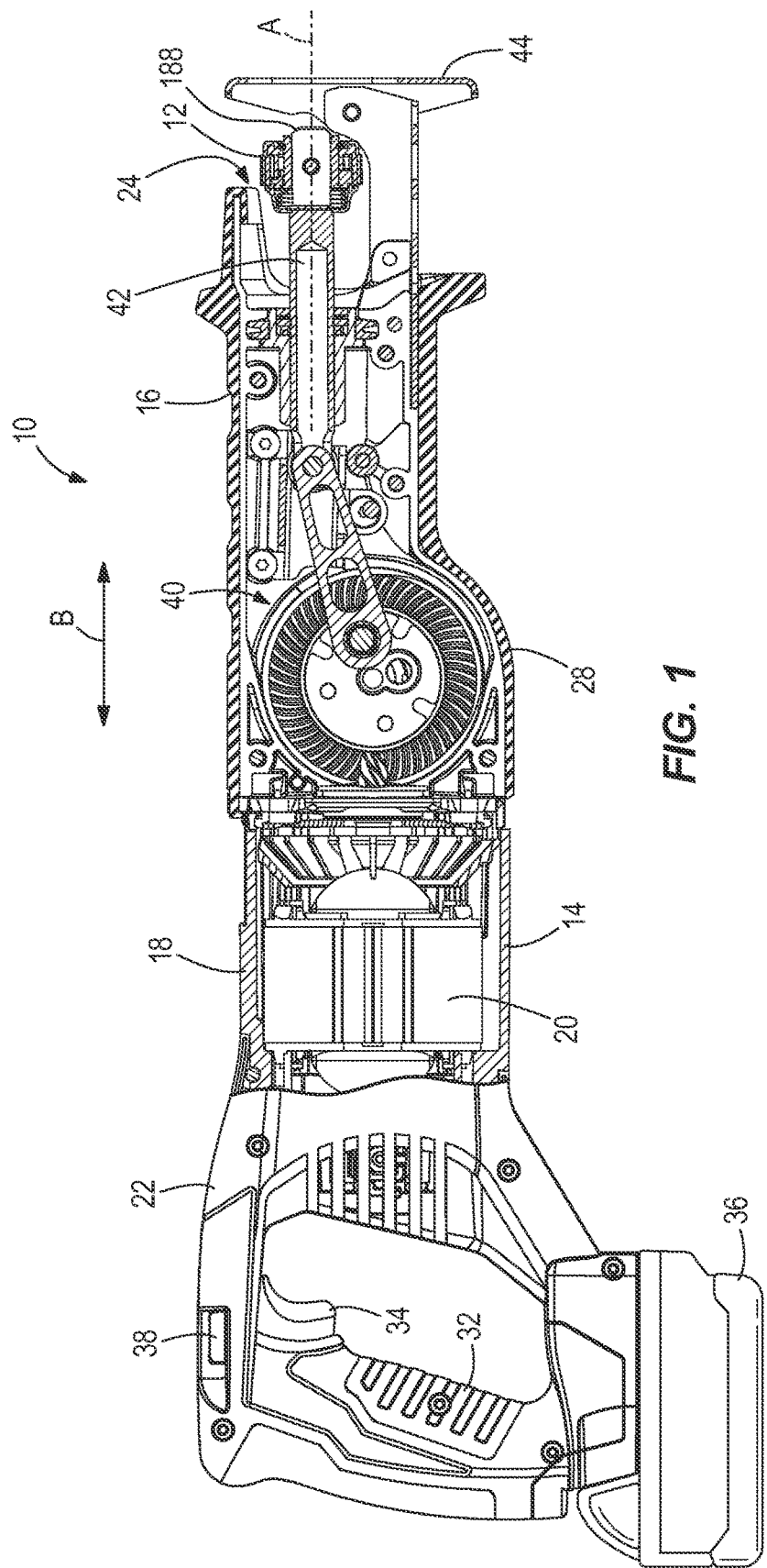
FIG. 1 is a partial cross-sectional view of a reciprocating power tool for receiving an accessory according to an embodiment of the invention.

FIG. 1 illustrates a reciprocating power tool 10 including a blade clamp mechanism 12. The illustrated reciprocating power tool 10 is a reciprocating saw. As shown in FIG. 1, the power tool 10 includes a saw housing 14 having a forward portion 16, a body portion 18 housing a motor 20 and a handle portion 22. The forward portion 16 of the saw housing 14 includes a blade receiving aperture or end 24 that receives an accessory, as will be described in greater detail below. The accessory may be, for example, a scraper blade 46 (e.g., FIGS. 2-8) or a saw blade 346 (e.g., FIG. 9). The accessory is releasably coupled to the blade clamp mechanism 12 positioned within the saw housing 14 and, specifically, within the receiving aperture 24. In the illustrated embodiment, a boot or grip portion 28 is positioned over the forward portion 16 of the saw housing 14. The boot 28 may provide a grip area (not shown) for the user and/or provides protection to the tool 10. In some embodiments, the boot 28 is over-molded onto the forward portion 16. The handle portion 22 includes an over-mold to define an ergonomic grip 32 and allows a user to hold and control the power tool 10.

With continued reference to FIG. 1, the power tool 10 includes a trigger-type power switch 34 for activating a power supply 36 of the tool 10 and a button or switch 38 for selecting a speed level (e.g., a high speed or a low speed) for reciprocating the accessory. In the illustrated embodiment, the power supply 36 is a rechargeable battery pack. The battery pack 36 is releasably coupled to the handle portion 22 to provide power to the power tool 10, and is releasable away from and rearward of the handle portion 22. In the illustrated embodiment, the battery pack 36 is an eighteen-volt (18V) rechargeable power tool battery pack. In other embodiments, the battery pack 36 may be a twelve-volt (12V), a twenty-four-volt (24V), or other various voltages that are known in the art. According to another embodiment, the power supply 36 may be an alternating current (AC) power provided via a corded plug electrically coupled to a wall outlet or any number of suitable powering options.

With reference to the cross section illustrated in FIG. 1, the reciprocating tool 10 also includes a drive mechanism 40 positioned substantially within the housing 14. The drive mechanism 40 is coupled to the motor 20 and to a spindle 42 for transferring rotational motion of a shaft of the motor 20 into reciprocating motion of the spindle 42 along a longitudinal axis A relative to the housing 14. The blade clamp mechanism 12 is disposed at a distal end of the spindle 42 for receiving the accessory. The blade clamp mechanism 12 secures the accessory 46 to the spindle 42 for reciprocation with the spindle 42 in a direction B, which is substantially parallel to the longitudinal axis A. In other embodiments, other suitable types and configurations of blade clamp mechanisms may be employed.

The reciprocating tool 10 also includes a removable shoe 44, illustrated in FIG. 1, operable to engage a work piece and provide stability to the tool 10 while cutting. The shoe 44 may be removed when the accessory is attached to the blade clamp mechanism 12. The shoe 44 acts as a stop to limit the depth of the accessory into the workpiece and to prevent the workpiece from engaging the accessory at a connection of the accessory to the tool 10, e.g., at the blade clamp mechanism 12. In some embodiments, the shoe 44 freely pivots about an axis to allow the user to adjust an angle at which the accessory 46 engages the workpiece during a cut. In some embodiments, the reciprocating tool 10 may not include a shoe.

In other embodiments, the power tool 10 may include various handle constructions, drive mechanisms, blade clamp mechanisms, and power configurations that are known in the art. In further embodiments, the power tool 10 may include other types of power and speed control switches or may not include a speed control feature.

Figure 2:
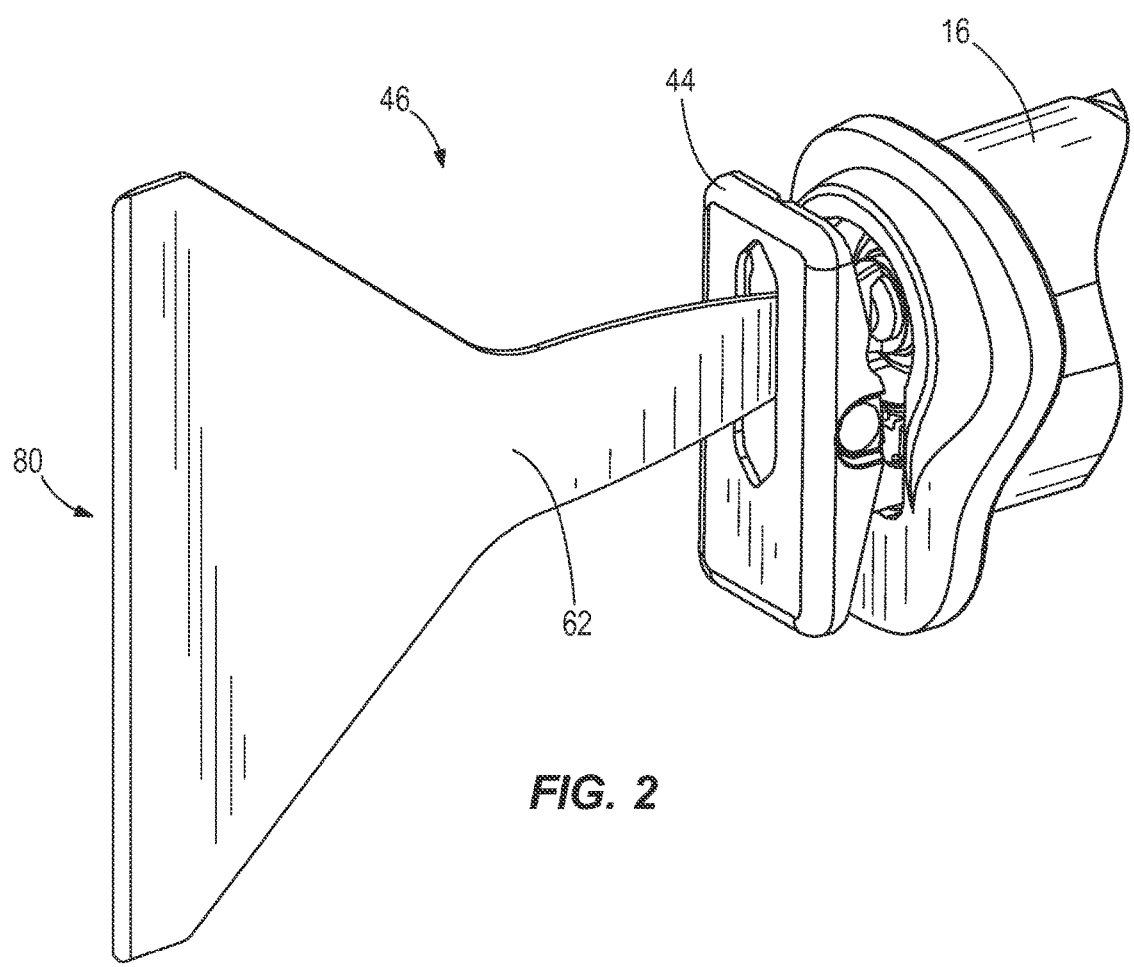
FIG. 2 is a perspective view of the reciprocating power tool shown in FIG. 1 and an accessory according to one embodiment of the invention.
Figure 3:
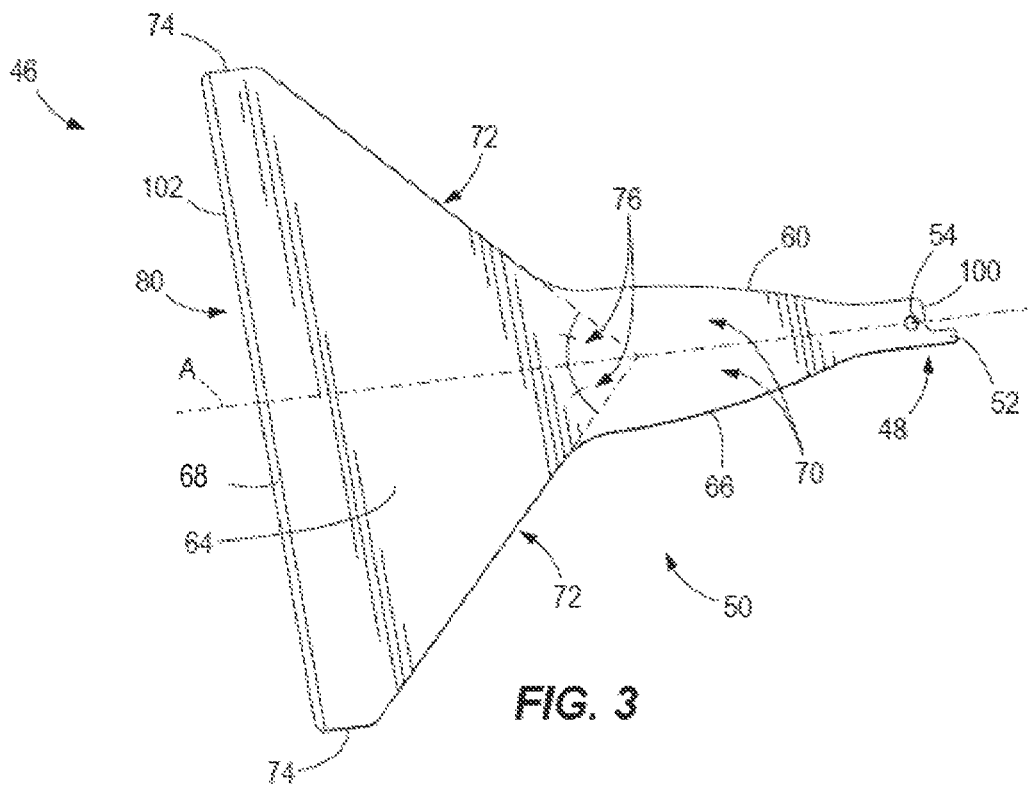
FIG. 3 is a perspective side view of a first side of the accessory of FIG. 2.
Figure 4:
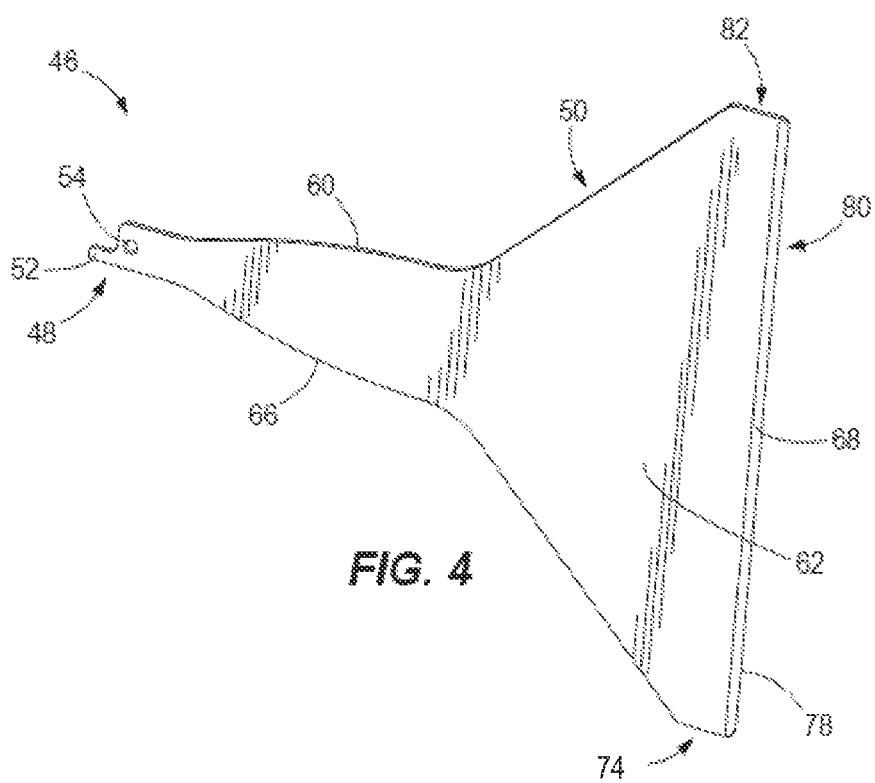
FIG. 4 is a perspective view of a second side of the accessory of FIG. 2.

FIGS. 2-4 illustrate the accessory 46. The accessory 46 illustrated in FIGS. 2-4 is a scraper blade having a first end 100 and a second end 102 opposite the first end 100. The accessory includes an attachment portion 48 and a body 50 extending from the attachment portion 48. The attachment portion 48 includes a tang member 52 and an aperture 54, which are configured to engage with the blade clamp mechanism 12 to securely and releasably connect the accessory 46 to the reciprocating tool 10. In other embodiments, other types or configurations of attachment portions may be employed in order to suit the blade clamp mechanism 12 of the reciprocating tool 10.

Further with respect to FIGS. 3-4, the body 50 includes a first narrow side 60, a second narrow side 66, and first and second broad sides 62, 64. The first and second narrow sides 60, 66 and the first and second broad sides 62, 64 extend between first and second ends 100 and 102 of the accessory 46. The first and second side narrow sides 60, 66 each include a generally curved section 70, a generally slanted section 72, and a flat section 74. The curved section 70 extends from the attachment portion 48. The slanted section 72 is oriented at an angle 76 with respect to the axis of reciprocation A. The flat section 74 is oriented substantially parallel with respect to the axis of reciprocation A. A scraping blade 80 is defined by an angled end surface 68 of the accessory 46, and a sharp edge 78 connects the first and second narrow sides 60, 66 at the end surface 68. The end surface 68 slants from the second broad side 64 to the first broad side 62, thereby creating the cutting edge 78. The length of the scraping blade 80 is seven inches in the illustrated embodiment. The dimensions of the body 50 illustrated in FIGS. 2-4 is just one possible embodiment of the accessory 46, and in other embodiments, the body has other suitable dimensions.

The sharp edge 78 of accessory 46 is induction hardened, which increases durability of the scraping blade 80. However, durability of the blade 80 can be accomplished by any suitable manner. Further, the scraping blade may be resharpened to be used to scrape material for a variety of applications.

During operation of the accessory, the scraping blade 80 reciprocates against a working surface thereby scraping or removing material from the working surface. The elongated scraping blade 80 is suitable for removing material from the working surface and preparing the surface having a large surface area.

Figure 5:
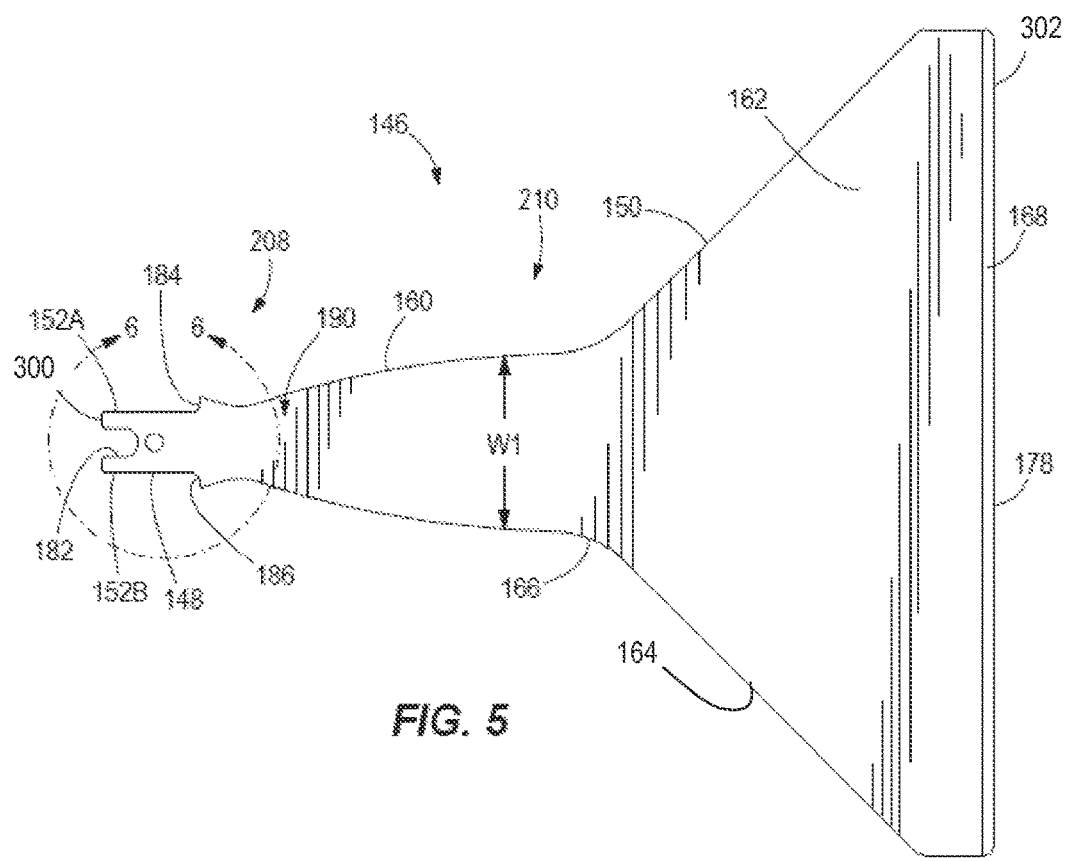
FIG. 5 is a side view of an accessory according to another embodiment of the invention.
Figure 6:
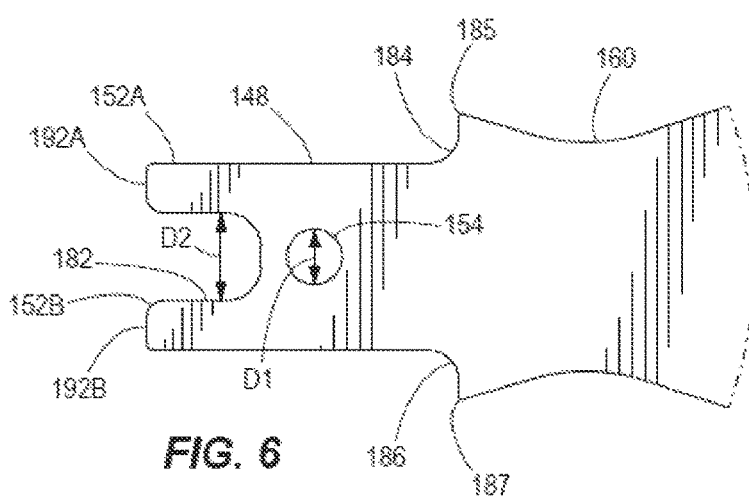
FIG. 6 is an enlarged view of a portion of FIG. 5.
Figure 7:
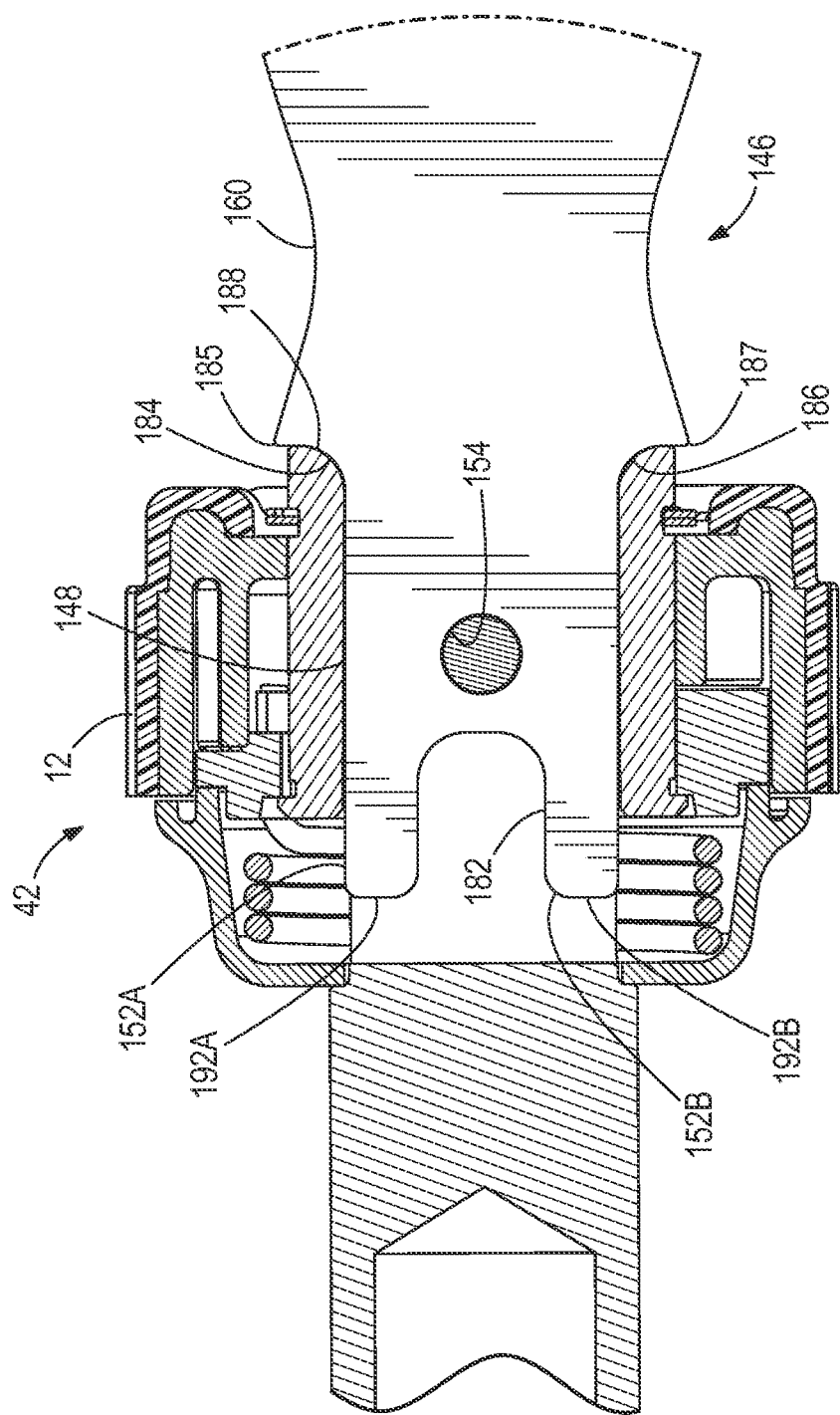
FIG. 7 is a side view of the portion of the accessory of FIG. 6 engaged with a spindle of the saw of FIG. 1.

FIGS. 5-7 illustrate an accessory or scraper blade 146 according to another embodiment. The scraper blade 146 includes features similar to the accessory 46 of FIGS. 2-4 and like components have been given like reference numbers plus 100 and only differences between the accessories 46 and 146 will be described in detail. The scraper blade 146 includes a first end 200 and a second end 202 opposite the first end 200. The scraper blade 146 includes an attachment portion 148 and a body 150.

The body portion 150 includes a sharp or cutting edge 178 on the second end 202 of the scraper blade 146. The body 150 also includes a first broad side 162 and a second broad side 164 that extend between the first end 200 and the second end 202. The first broad side 162 face opposite the second broad side 164. The first narrow side 160 and the second narrow side 166 also extend between the first end 200 and the second end 202. The second narrow side 166 faces opposite the first narrow side 160. The cutting edge 178 is a straight continuous edge that extends from the first narrow side 160 to the second narrow side 166. The cutting edge 178 is approximately between 5 inches and 7 inches. The cutting edge lies in a plane substantially parallel to the first broad side 162 and the second broad side 164.

The attachment portion 148, which is adjacent the first end 200 of the scraper blade 146 and includes an aperture 154, includes a first tang member 152A and a second tang member 152B spaced from the first tang 152A by a generally U-shaped aperture 182. The apertures 154, 182 extend from the first broad side 162 to the second broad side 164. The aperture 182 opens toward the first end 200 of the scraper blade 146. The aperture 154 is disposed between the U-shaped aperture 182 and projections 185, 187. A diameter D1 of the aperture 154 is smaller than a distance D2 between defined by the U-shaped aperture 182 between the first and second tang members 152A, and 152B. The attachment portion 148 also includes a first radius 184, which terminates to define the projection 185, that is located on the first narrow side 160 of the scraper blade 146 between the tang member 152A and the body 150. The attachment portion 148 further includes a second radius 186, which terminates to define the projection 187, that is located on the second narrow side 166 of the scraper blade 146 between the tang member 152B and the body 150. When the first end 200 of the scraper blade 146 is inserted into a slot of the spindle 42 (FIG. 7), a tip 188 of the spindle 42 contacts the radiuses 184 and 186 (i.e., the radiuses 184 and 186 do not enter the slot, but rather abut the exterior of the spindle 42 at the tip 188 and the radiuses 184 and 186 contact the tip 188 to inhibit further insertion of the scraper blade 146 into the spindle 42).

A width W1 (FIG. 5) of the scraper blade 146 is defined as the distance from the first narrow side 160 to the second narrow side 166 measured along the first broad side 162. The width W1 decreases in a direction from the first and second projections 185, 187 toward the cutting edge 178 along a neck portion 208 of the scraper blade 146. The width W1 decreases linearly along the neck portion 208. The width W1 increases in the direction from the neck portion 208 toward the cutting edge 178 along a middle portion 210 of the scraper blade.

In operation, when the scraper blade is used with the saw 10, bending load on the scraper blade 146 from the blade 180 contacting the work-piece is transmitted from the scraper blade 146 to the spindle 42 at the radiuses 184 and 186 because the radiuses 184, 186 contact the spindle 42. Therefore, the bending load and stress is concentrated in a region of the scraper blade 146 generally in the area of arrow 190 of FIG. 5, which is relatively wide and able to withstand a relatively large amount of stress caused by bending of the scraper blade 146. Without the radiuses 184 and 186 a majority of the bending load and related stress would be concentrated on ends 192A, 192B of the tang members 152A, 152B. The ends 192A, 192B are not able to withstand as much bending load or stress as the area 190. Therefore, the radiuses 184 and 186 increase the strength of the scraper blade 146 and increase the ability of the scraper blade 146 to withstand bending loads and stresses during operation of the scraper blade 146 with the saw 10.

Figure 8:
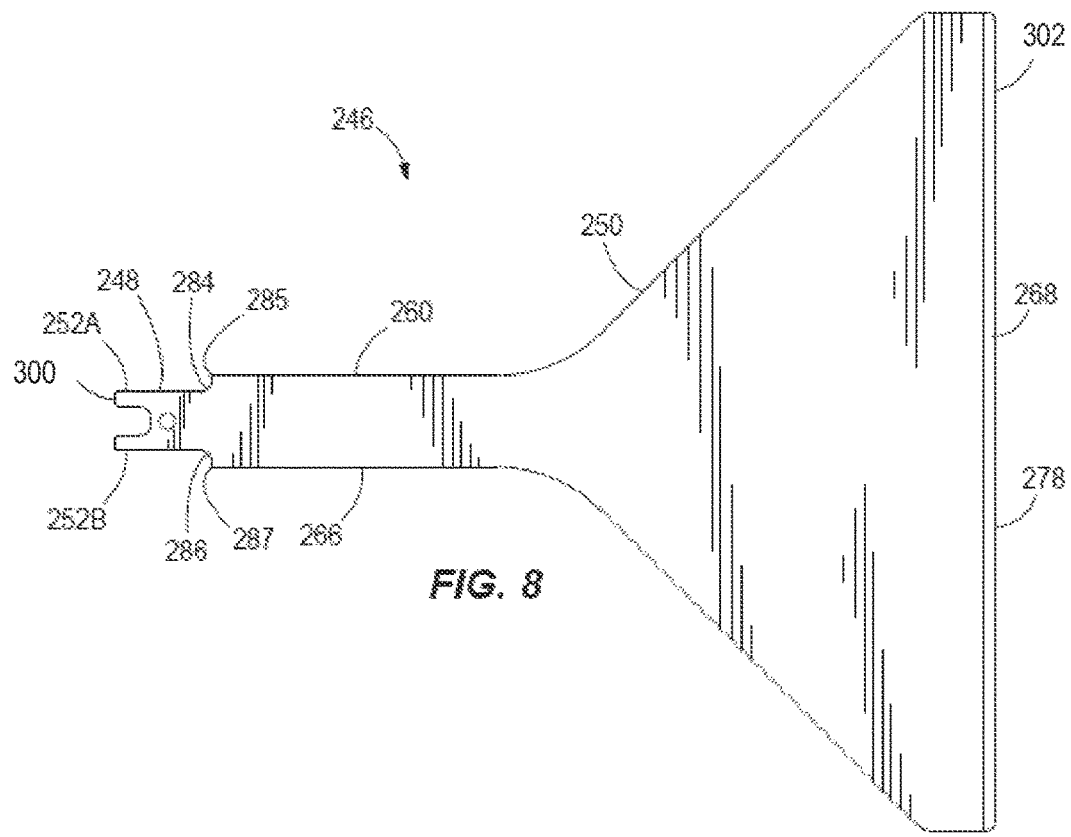
FIG. 8 is a side view of an accessory according to another embodiment of the invention.

FIG. 8 illustrates an accessory 246 according to another embodiment. The accessory 246 includes features similar to the accessory 146 of FIGS. 5-7 and like components have been given like reference numbers plus 100 and only differences between the accessories 246 and 146 will be described in detail. The accessory 246 includes an attachment portion 248 and a body 250. A first radius 284, which creates a projection 285, is located on a first narrow side 260 of the accessory 246. A second radius 286, which creates a projection 287, is located on a second narrow side 266 of the accessory 246. In the embodiment of FIG. 8, the first narrow side 260 and the second narrow side 266 between the attachment portion 248 and the body 250 are substantially straight. Whereas, in the embodiment of FIGS. 5-7, the first and second narrow sides 160 and 166 have radiuses such that the first and second narrow sides 160 and 166 are curved.

Figure 9:
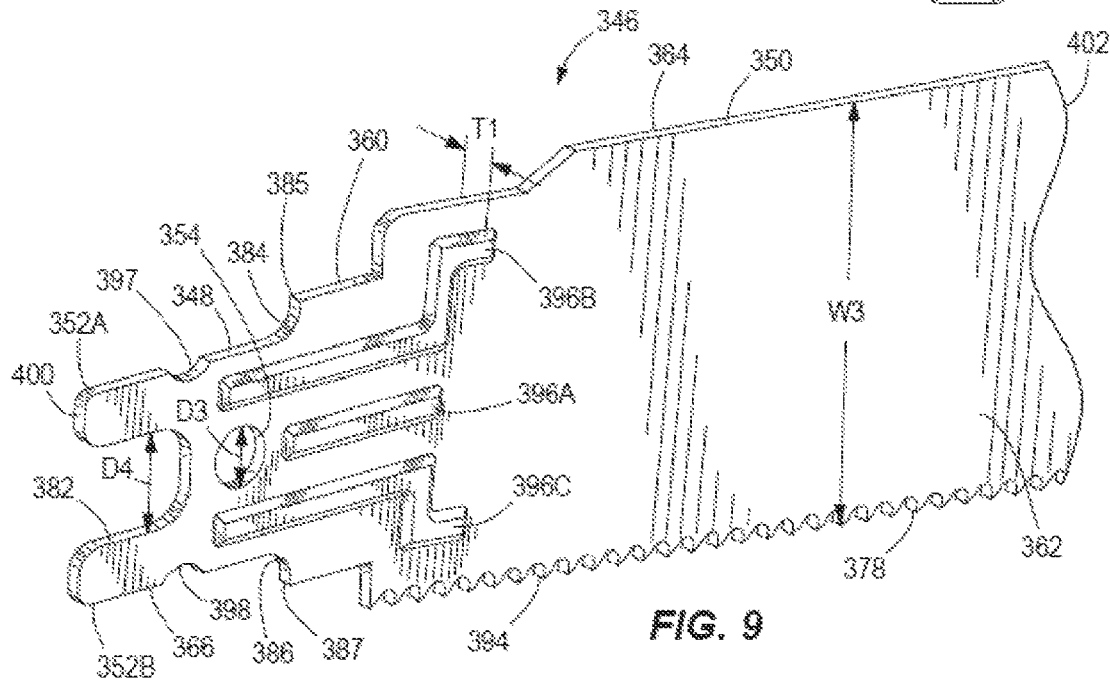
FIG. 9 is a perspective view of an accessory according to yet another embodiment of the invention.

FIG. 9 illustrates an accessory 346 according to another embodiment. The accessory 346, which is a saw blade in the illustrated embodiment, includes features similar to the accessories 146 and 246 of FIGS. 5-8 and like components have been given like reference numbers in the 300 series and only differences between the accessories 146 and 346 will be described in detail. The blade 346 includes a first end 400 and a second end 402 opposite the first end 400. The blade 346 includes an attachment portion 348 and a body 350.

The body 350 includes a first broad side 362 and a second broad side 364 that extend between the first end 400 and the second end 402. The second broad side 362 faces opposite the first broad side 364. A first narrow side 360 and a second narrow side 366 extend between the first end 400 and the second end 402. The second narrow side 366 faces opposite the first narrow side 360. A width W3 of the accessory 346 is defined as the distance from the first narrow side 160 to the second narrow side 366 measured along the first broad side 362. The body 350 includes a cutting edge 378 that includes a plurality of cutting teeth 394. The cutting teeth 394 extend along the second narrow side 366.

The attachment portion 348 includes a first tang member 352A and a second tang member 352B spaced from the first tang 352A by a generally U-shaped aperture 382. A diameter D3 of the aperture 354 is smaller than a distance D4 defined by the U-shaped aperture 382 between the first and second tang members 352A, and 352B. A first radius 384, which terminates to define a projection 385, is located on the first narrow side 360 of the blade 346 between the tang member 352A and the body 350. A second radius 386, which terminates to define a projection 387, is located on the second narrow side 366 of the blade 346 between the tang member 352B and the body 350. A first recess 397 is located on the first narrow side 360 between the first end 400 and the first projection 385. Similarly, a second recess 398 is located on the second narrow side 366 between the first end 400 and the second projection 387. The first and second recesses are configured to receive a portion of a blade clamp mechanism 12. The apertures 354, 382 extend from the first broad side 162 to the second broad side 164. The aperture 382 opens toward the first end 400 of the accessory 346. The aperture 354 is disposed between the U-shaped aperture 382 and the projections 385, 387.

As discussed above with respect to FIGS. 5-7, when a first end 400 of the blade 346 is inserted into a slot of the spindle 42 (FIG. 7), a tip 188 of the spindle 42 contacts the radiuses 384 and 386 (i.e., the radiuses 384 and 386 do not enter the slot but rather abut the outside of the spindle 42 at the tip 188 and the radiuses 384 and 386 contact the tip 188 to inhibit further insertion of the blade 346 into the spindle 42). As discussed above with regard to the accessory 146 of FIGS. 5-7, the radiuses 384 and 386 increase the strength of the blade 346 and increase the ability of the blade 346 to withstand bending loads and stresses during operation of the accessory 346 with the saw 10.

Further, the first broad side 362 includes a plurality of ribs 396. In the illustrated embodiment the plurality of ribs extend along portions of the attachment portion 348 and the body portion 350, but other rib configurations may be possible. The plurality of ribs 396 provide additional rigidity to the blade 346 to resist unintentional bending of the saw blade 346, especially in the attachment portion 348. The added rigidity reduces deformation of the saw blade 346, improving the working life of the blade 346 and facilitating the teeth 394 remaining straight to provide a cleaner cut. Also, the plurality of ribs 396 increases the thickness T1 of the attachment portion 348 so that the attachment portion 348 has a tighter fit in the spindle 42 (FIG. 1). In the illustrated embodiment, the plurality of ribs 396 includes a center rib 396A substantially aligned with the aperture 354, a first side rib 396B, and a second side rib 396C. The first and second side ribs 396B, 396C are disposed on opposite sides of the aperture 354 and the center rib 396A. Additionally, each of the first and second side ribs 396B, 396C includes a straight portion that extends in parallel with the center rib 396A and a substantially L-shaped portion disposed at a distal end of the straight portion. Additional or other embodiment having ribs of other configurations is possible.

Although the invention has been described in detail with reference to certain preferred embodiments, variations and modifications exist within the scope and spirit of one or more independent aspects of the invention as described.

Thus, the invention provides, among other things, an accessory for use with a reciprocating saw that increases the strength of an attachment portion. As such, the likelihood that the accessory will fracture is decreased. Various features and advantages of the invention are set forth in the following claims.

What is claimed is:

1. A reciprocating saw comprising: a spindle;
   a scraper blade configured for use with the reciprocating saw, the scraper blade configured to be coupled to the spindle to reciprocate with the spindle, the scraper blade including;
   a first end configured to be received in the spindle of the reciprocating saw; a second end opposite the first end;
   a cutting edge that defines the second end of the scraper blade and that is configured to engage a work surface, which generates a bending stress on the scraper blade when the reciprocating saw is operated;
   a first broad side that extends between the first end and the second end; a second broad side facing opposite the first broad side, the second broad side extends between the first end and the second end;
   a first narrow side that extends between the first and second broad sides and the first and second ends;
   a second narrow side facing opposite the first narrow side, the second narrow side extends between the first and second broad sides and the first end and the second end;
   an attachment portion adjacent the first end of the scraper blade, the attachment portion including,
   a tang including a first tang projection and a second tang projection; an aperture that extends through the attachment portion from the first broad side to the second broad side,
   a first radius located on the first narrow side and the first radius terminating to define a projection, the first radius contacts an exterior of the spindle, and
   a second radius located on the second narrow side and the second radius terminating to define a projection, the second radius contacts the exterior of the spindle; a blade portion adjacent the second end of the scraper blade, the blade portion having a width, defined as the distance from the first narrow side to the second narrow side measured along the first broad side, that increases in a direction moving from the first end to the second end and towards the cutting edge;
   a neck portion extending between the attachment portion and the blade portion, the neck portion including portions of the first narrow side and the second narrow side that are nonparallel such that the first narrow side and the second narrow side converge adjacent to the attachment portion and then subsequently the first narrow side and the second narrow side diverge toward the blade portion to define a second width that is wider than a third width measured from the projection defined by the first radius to the projection defined by the second radius;
   wherein the first radius and the second radius transmit the bending stress from the scraper blade to the spindle to prevent breakage of the scraper blade.

2. The reciprocating saw of claim 1, wherein the attachment portion further includes a generally U-shaped aperture disposed between the first and second tang projections, the U-shaped aperture extending from the first broad side to the second broad side and opening toward the first end of the scraper blade.

3. The reciprocating saw of claim 1, wherein the cutting edge lies in a plane parallel to the first broad side and the second broad side.

4. The reciprocating saw of claim 1, wherein in the cutting edge is a straight continuous edge that extends from the first narrow side to the second narrow side.

5. The reciprocating saw of claim 1, wherein a width of the neck portion decreases linearly along the neck portion.

6. The reciprocating saw of claim 2, wherein the aperture is disposed between the projections and the U-shaped aperture.

7. The reciprocating saw of claim 2, wherein a diameter of the aperture is smaller than a distance from the first tang projection to the second tang projection between the U-shaped aperture.

8. The reciprocating saw of claim 1, further including a slot that receives the tang and the aperture on an interior of the slot, and the projection of the first radius and the projection of the second radius are located outside of the slot.

9. The reciprocating saw of claim 1, wherein the spindle includes a blade clamp that surrounds and engages the tang and aperture to secure the scraper blade to the spindle.

10. The reciprocating saw of claim 9, wherein the projection defined by the first radius and the projection defined by the second radius are located outside of the blade clamp.

11. The reciprocating saw of claim 1, wherein the spindle includes a blade clamp that receives only the tang and the aperture of the attachment portion.

12. The reciprocating saw of claim 1, wherein the spindle includes a blade clamp that is substantially the same size as the tang.

* * * * *